United States Patent [19]
Kojima et al.

[11] Patent Number: 5,714,534
[45] Date of Patent: Feb. 3, 1998

[54] RESIN COMPOSITIONS HAVING EXCELLENT ANTISTATIC PROPERTIES

[75] Inventors: Nobumoto Kojima; Kouzo Ichikawa; Hideo Amemiya; Shinji Okajima; Takayoshi Sekido, all of Kanagawa-ken; Mitsuyoshi Kato, Aichi-ken, all of Japan

[73] Assignee: Mitsui Toatsu Chemicals, Inc., Tokyo, Japan

[21] Appl. No.: 539,749

[22] Filed: Oct. 5, 1995

Related U.S. Application Data

[63] Continuation-in-part of Ser. No. 354,634, Dec. 13, 1994, abandoned.

[30] Foreign Application Priority Data

Dec. 27, 1993 [JP] Japan ................................. 5-331749

[51] Int. Cl.$^6$ ................................................ C08K 5/41
[52] U.S. Cl. ........................ 524/156; 524/161; 524/432; 524/433
[58] Field of Search ........................ 524/432, 433, 524/156, 161

[56] References Cited

U.S. PATENT DOCUMENTS

| | | | |
|---|---|---|---|
| 3,891,584 | 6/1975 | Ray-Chaudhuri et al. | 260/27 R |
| 4,315,081 | 2/1982 | Kobayashi et al. | 525/2 |
| 4,476,271 | 10/1984 | Kano et al. | 524/377 |
| 5,151,457 | 9/1992 | Ishida et al. | 524/157 |
| 5,334,635 | 8/1994 | Udipi | 524/377 |

FOREIGN PATENT DOCUMENTS

| | | |
|---|---|---|
| 361712 | 4/1990 | European Pat. Off. |
| 422879 | 4/1991 | European Pat. Off. |

*Primary Examiner*—Judy M. Reddick
*Attorney, Agent, or Firm*—Burns, Doane, Swecker & Mathis

[57] ABSTRACT

A resin composition having excellent antistatic properties is provided which comprises (A) 100 parts by weight of a styrene resin, (B) 3 to 35 parts by weight of a polyethylene oxide, (C) 0.1 to 10 parts by weight of a styrene-acrylonitrile-hydroxyalkyl acrylate copolymer and/or a styrene-acrylonitrile-hydroxyalkyl methacrylate copolymer, (D) 4 to 100 parts by weight of a (meth)acrylic ester polymer, and/or an oxide selected from the group consisting of titanium oxide, zinc oxide and magnesium oxide, the oxide being present in an amount of 0.7 to 5 parts by weight per 100 parts by weight of the combined amount of components (A) and (B), and (E) a surface-active agent comprising a specified sulfonic acid salt or alkylsulfuric acid salt, the surface-active agent being present in an amount of 0.4 to 5 parts by weight per 100 parts by weight of the combined amount of components (A), (B), (C) and (D). This resin composition can be used for general household articles including, for example, wardrobe cases.

6 Claims, No Drawings

RESIN COMPOSITIONS HAVING EXCELLENT ANTISTATIC PROPERTIES

CROSS-REFERENCE TO RELATED APPLICATIONS

This application is a Continuation-In-Part of application Ser. No. 08/354,634, which was filed on Dec. 13, 1994, now abandoned.

BACKGROUND OF THE INVENTION a) Field of the Invention

This invention relates to resin compositions having excellent practical physical properties and antistatic properties.

b) Description of the Related Art

Generally speaking, general-purpose resins such as styrene resins and acrylic resins have excellent electrical insulating properties. Because of this characteristic feature, they are being commonly used in electric and electronic parts.

On the other hand, since they have a well-balanced combination of mechanical strength, thermal resistance and moldability, they are also used widely in fields of application not necessarily requiring electrical insulating properties. In such fields of application not requiring electrical insulating properties, however, their good electrical insulating properties conversely constitute a shortcoming in that they are easily charged by friction, contact or the like to attract dust, thus detracting from their appearance and/or causing electrostatic destruction of ICs or the like. Moreover, with the recent densification of magnetic recording media, the so-called dropout phenomenon has come to occur frequently as a result of dust attraction caused by electric charging of the recording medium housing. This poses a serious problem in the related fields of application.

In order to solve the above-described problems, it has been conventional practice to reduce the surface resistivities of such general-purpose resins by incorporating thereinto an antistatic agent that is a low-molecular-weight surface-active agent or by applying an antistatic agent to the surfaces of molded articles thereof.

When an antistatic agent is incorporated into styrene resins and acrylic resins, its antistatic effect generally continues as long as the antistatic agent is present in the resin surface. However, once the antistatic agent is removed by washing the resin surface with water or wiping it with cloth or the like, the antistatic capability is markedly reduced because it is difficult for the antistatic agent present within the resin to exude to the surface. Moreover, in order to achieve the desired antistatic capability, a relatively large amount of antistatic agent needs to be incorporated or applied. This makes the surfaces of molded articles sticky.

In order to solve these problems, a resin composition comprising a styrene resin containing a polyethylene oxide having a specific molecular weight and a sulfonic acid salt having a specific structure has been proposed (Japanese Patent Laid-Open No. 233743/'90) and put to practical use. However, this resin composition has the disadvantage that it tends to whiten when exposed to hot water for a long period of time. Moreover, a styrene resin composition comprising a styrene resin, a polyethylene oxide having a specific viscosity-average molecular weight, a specific agent for improving resistance to hot water, a specific surface-active agent, and optionally a specific (poly)ethylene glycol has been proposed (Japanese Patent Laid-Open No. 175355/'92 (U.S. Pat. No. 5,151,457)) and put to practical use. However, this resin composition has the disadvantage that blisters may be formed on the surfaces of molded articles thereof when they are exposed to an atmosphere of abnormally high temperature and humidity for along period of time (e.g., to an atmosphere of 60° C. and 90% RH for a week). Accordingly, the earliest possible solution of this problem is desired in fields of application requiring resistance to high temperature and humidity.

SUMMARY OF THE INVENTION

In view of these circumstances, the present inventors made intensive studies and have now found that the above-described problems can be solved by resin compositions comprising a styrene resin, a polyethylene oxide having a specific viscosity-average molecular weight, a specific agent for improving resistance to hot water, a specific surface-active agent, a specific agent for improving resistance to high temperature and humidity, and optionally a specific (poly)ethylene glycol. The present invention has been completed on the basis of this finding.

Thus, according to a first aspect of the present invention, there is provided a resin composition having excellent antistatic properties which comprises (A) 100 parts by weight of a styrene resin;

(B) 3 to 35 parts by weight of a polyethylene oxide having a viscosity-average molecular weight of 15,000 to 1,500,000;

(C) 0.1 to 10 parts by weight of a styrene-acrylonitrile-hydroxyalkyl acrylate copolymer and/or a styrene-acrylonitrile-hydroxyalkyl methacrylate copolymer;

(D) 4 to 100 parts by weight of a (meth)acrylic ester polymer; and (E) a surface-active agent comprising a sulfonic acid salt of the formula

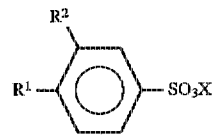

where each of $R^1$ and $R^2$ represents a hydrogen atom or an alkyl group of 12 or less carbon atoms and X represents one or more alkali metal atoms selected from the group consisting of Na, Li and K, or an alkylsulfuric acid salt of the formula $R^3$—$OSO_3M$ where $R^3$ represents an alkyl group of 8 to 20 carbon atoms and M represents one or more ions selected from the group consisting of K, Na and $NH_4$, the surface-active agent being present in an amount of 0.4 to 5 parts by weight per 100 parts by weight of the combined amount of components (A), (B),(C) and (D).

According to a second aspect of the present invention, there is provided a resin composition having excellent antistatic properties in which the aforesaid component (D) is replaced by an oxide selected from the group consisting of titanium oxide, zinc oxide and magnesium oxide, the oxide being present in an amount of 0.7 to 5 parts by weight per 100 parts by weight of the combined amount of components (A) and (B).

According to a third aspect of the present invention, there is provided a resin composition having excellent antistatic properties in which the aforesaid component (D) is replaced by ($D_1$) 4 to 100 parts by weight of a (meth)acrylic ester polymer and ($D_2$) an oxide selected from the group consisting of titanium oxide, zinc oxide and magnesium oxide, the oxide being present in an amount of 0.7 to 5 parts by weight per 100 parts by weight of the combined amount of components (A) and (B).

The antistatic properties of the resin compositions of the present invention comprising the aforesaid components (A) to (E) can further be improved by incorporating thereinto, as component (F), a (poly)ethylene glycol having an average molecular weight of 62 to 1,200 in an amount of 0.05 to 5 parts by weight per 100 parts by weight of the combined amount of components (A), (B), (C) and (D).

DETAILED DESCRIPTION OF THE INVENTION

The styrene resin used in the present invention is a polymer of a styrene monomer, a copolymer of styrene monomers, or optionally a copolymer of a styrene monomer and another monomer, i.e., a styrene resin selected from the group consisting of homopolymers of a styrene compound selected from the group consisting of styrene and derivatives thereof, copolymers of at least two such styrene compounds and copolymers of a styrene compound with other copolymerizable monomers. Useful styrene monomers include styrene; substituted styrenes having an alkyl substituent in the side chain, such as α-methylstyrene and α-ethylstyrene; substituted styrenes having an alkyl substituent on the ring, such as vinyltoluene and p-methylstyrene; halogenated styrenes such as monochlorostyrenes, dichlorostyrenes, tribromostyrenes and tetrabromostyrenes; and the like. Especially preferred are styrene and α-methylstyrene. At least one of these styrene monomers may be used. If desired, acrylonitrile monomers (such as acrylonitrile, methacrylonitrile and fumaronitrile), maleimide monomers (such as maleimide and N-phenylmaleimide), acrylic ester monomers (such as methyl acrylate and methyl methacrylate), maleic acid monomers (such as maleic acid and maleic anhydride) and the like may be used in combination with the above-described styrene monomers.

The aforesaid styrene resin may be modified with a rubbery polymer. Useful rubber polymers include polybutadiene, styrene-butadiene copolymer, butadiene-acrylonitrile copolymer, ethylene-propylene-diene copolymer, butadiene-acrylic ester copolymer and the like.

In the rubber-modified resin, the rubbery polymer is dispersed in the form of particles to form a dispersed phase (called "microgel"). On the other hand, the styrene resin comprising a polymer of a styrene monomer, a copolymer of styrene monomers, or optionally a copolymer of a styrene monomer and another monomer forms a continuous phase. The aforesaid microgel also contains the styrene resin in a grafted or occluded form. When observed in an electron micrograph, the microgel exists in the form of islands and the continuous phase in the form of a sea.

The styrene resin can be prepared according to any of well-known techniques such as bulk polymerization, suspension polymerization and emulsion polymerization.

The polyethylene oxide used in the present invention has a viscosity-average molecular weight of 15,000 to 1,200,000. If its viscosity-average molecular weight is less than 15,000, the polyethylene oxide will have good compatibility with the styrene resin but will fail to produce a satisfactory antistatic effect. On the other hand, if its viscosity-average molecular weight is greater than 1,200,000, the polyethylene oxide will have so poor compatibility with the styrene resin as to cause delamination in the molded articles, resulting in a reduction in mechanical strength and antistatic capability. In consideration of these facts, the polyethylene oxide used in the present invention preferably has a viscosity-average molecular weight of 20,000 to 1,000,000, more preferably 50,000 to 500,000, and most preferably 100,000 to 300,000.

The term "viscosity-average molecular weight" as used herein is defined in the following manner. The ratio of the viscosity η of an aqueous polyethylene oxide solution at 30° C. to the viscosity ($\eta_0$) of pure water at 30° C. is defined as the relative viscosity ($\eta_{rel}=\eta/\eta_0$). Then, the specific viscosity ($\eta_{sp}$) is obtained from the relative viscosity according to the following formula.

$$\eta_{sp}=\eta_{rel}-1$$

Next, the reduced viscosity ($\eta_{red}=\eta_{sp}/C$) is obtained by dividing the specific viscosity ($\eta_{sp}$) by the concentration (C, grams per 100 ml solution) of the aqueous polyethylene oxide solution.

Furthermore, the values of reduced viscosity ($\eta_{red}$) at various concentrations (C) are extrapolated to C=0 (an infinitely dilute solution) to obtain the intrinsic viscosity ([η]), from which the viscosity-average molecular weight ($M_v$) is determined according to the following relationship.

$$[\eta]=1.25\times10^{-4}M_v^{0.78}$$

No particular limitation is placed on the method for preparing the polyethylene oxide, and any of commercially available polyethylene oxides having a viscosity-average molecular weight within the aforesaid limits may be used. If any other polyalkylene oxide or its derivative (e.g., polypropylene glycol, methoxypolyethylene glycol, polyethylene glycol monooctyl ether, polyethylene glycol monostearate or polyethylene glycol monolaurate) is used in place of the polyethylene oxide, antistatic properties will not be manifested satisfactorily and, therefore, the desired effects cannot be achieved.

The content of the polyethylene oxide is in the range of 3 to 35 parts by weight, preferably 5 to 20 parts by weight, per 100 parts by weight of the styrene resin. If the content of the polyethylene oxide is less than 3 parts by weight, the resulting resin composition will have insufficient antistatic properties and exhibit dust attraction as a result of friction. On the other hand, if its content is greater than 35 parts by weight, the resulting resin composition will be significantly reduced in mechanical strength. In particular, the reduction in impact strength is so marked that it is difficult to maintain the practical strength. Thus, this resin composition cannot be used to make large-sized moldings such as electric and electronic parts.

The styrene-acrylonitrile-hydroxyalkyl acrylate copolymer and/or the styrene-acrylonitrile-hydroxyalkyl methacrylate copolymer used as component (C) in the present invention is a copolymer or copolymers formed from a styrene monomer, an acrylonitrile monomer, and a hydroxyalkyl acrylate monomer and/or a hydroxyalkyl methacrylate monomer. Useful styrene monomers include styrene; substituted styrenes having an alkyl substituent in the side chain, such as α-methylstyrene and α-ethylstyrene; substituted styrenes having an alkyl substituent on the ring, such as vinyltoluene and p-methylstyrene; halogenated styrenes such as monochlorostyrenes, dichlorostyrenes, tribromostyrenes and tetrabromostyrenes; and the like. Especially preferred are styrene and α-methylstyrene. At least one of these styrene monomers may be used. Useful acrylonitrile monomers include acrylonitrile, methacrylonitrile, fumaronitrile and the like. Especially preferred is acrylonitrile. Useful hydroxyalkyl acrylate monomers include hydroxymethyl acrylate, hydroxyethyl acrylate, hydroxypropyl acrylate, hydroxybutyl acrylate and the like. Especially preferred is hydroxyethyl acrylate. Useful hydroxyalkyl methacrylate monomers include hydroxymethyl methacrylate, hydroxyethyl methacrylate, hydroxypropyl methacrylate, hydroxybutyl methacrylate and the like. Especially preferred is hydroxyethyl methacrylate. If desired, maleimide monomers (such as maleimide and N-phenylmaleimide), acrylic ester monomers (such as methyl acrylate and methyl methacrylate), maleic acid monomers (such as maleic acid and maleic anhydride) and the like may be used in combination with the foregoing styrene monomers and acrylonitrile monomers.

The content of the styrene-acrylonitrile-hydroxyalkyl acrylate copolymer and/or the styrene-acrylonitrile-hydroxyalkyl methacrylate copolymer is in the range of 0.1 to 10 parts by weight and preferably 0.5 to 5 parts by weight. If the content of the styrene-acrylonitrile-hydroxyalkyl acrylate copolymer and/or the styrene-acrylonitrile-hydroxyalkyl methacrylate copolymer is less than 0.1 part by weight, the resulting resin composition will have low resistance to high temperatures and humidity and may form blisters. On the other hand, if its content is greater than 10 parts by weight, the resulting resin composition will be significantly reduced in mechanical strength. In particular, the reduction in impact strength is so marked that it is difficult to maintain the practical strength.

The (meth)acrylic ester polymer used as component (D) or ($D_1$) in the present invention is a polymer of a (meth) acrylic ester monomer, a copolymer of (meth)acrylic ester monomers, or optionally a copolymer of a (meth)acrylic ester monomer and another monomer. Useful (meth)acrylic ester monomers include alkyl methacrylates such as methyl methacrylate, ethyl methacrylate, propyl methacrylate and butyl methacrylate; alkyl acrylates such as methyl acrylate, ethyl acrylate, propyl acrylate and butyl acrylate; and the like. Especially preferred is methyl methacrylate. At least one of these (meth)acrylic ester monomers may be used. If desired, such monomers as styrene, acrylonitrile, maleimide, acrylic acid, methacrylic acid and maleic anhydride may be used in combination with the foregoing (meth)acrylic ester monomers.

The content of the (meth)acrylic ester polymer is in the range of 4 to 100 parts by weight, preferably 10 to 60 parts by weight, per 100 parts by weight of the styrene resin. If the content of the (meth)acrylic ester polymer is less than 4 parts by weight, the resulting resin composition will have low resistance to hot water and tend to whiten on exposure to hot water. On the other hand, if its content is greater than 100 parts by weight, the resulting resin composition will show a reduction in antistatic capability and fail to accomplish the objects of the present invention.

The oxide used as component (D) or ($D_2$) in the present invention, which is selected from the group consisting of titanium oxide, zinc oxide and magnesium oxide, need not have a specific crystal structure or particle size and may be in any form that can be mixed with thermoplastic resins. The content of the aforesaid oxide is in the range of 0.7 to 5 parts by weight, preferably 2 to 3 parts by weight, per 100 parts by weight of the combined amount of the styrene resin (A) and the polyethylene oxide (B). If its content is less than 0.7 part by weight, the resulting resin composition will have low resistance to hot water and tend to whiten on exposure to hot water. On the other hand, if its content is greater than 5 parts by weight, the resulting resin composition will show a reduction in strength and, in particular, impact strength.

The sulfonic acid salts which can be represented by the above general formula and used as component (E) in the present invention include, for example, alkali metal salts of benzenesulfonic acid, toluenesulfonic acid, ethylbenzenesulfonic acid, propylbenzenesulfonic acid, isopropylbenzenesulfonic acid, n-butylbenzenesulfonic acid, isobutylbenzenesulfonic acid, sec-butylbenzenesulfonic acid, t-butylbenzenesulfonic acid, pentylbenzenesulfonic acid, dodecylbenzenesulfonic acid, xylenesulfonic acid, ethyltoluenesulfonic acid, cymenesulfonic acid, t-butyltoluenesulfonic acid and diethylbenezenesulfonic acid. The alkali metal ion can arbitrarily be selected from the group consisting of Na, Li and K. From the viewpoint of antistatic properties, the sodium salts of the foregoing sulfonic acids are most preferred.

The content of the sulfonic acid salt is in the range of 0.4 to 5 parts by weight, preferably 0.7 to 4 parts by weight, per 100 parts by weight of the combined amount of the styrene resin (A), the polyethylene oxide (B), the styrene-acrylonitrile-hydroxyalkyl acrylate copolymer and/or the styrene-acrylonitrile-hydroxyalkyl methacrylate copolymer (C), and the (meth)acrylic ester polymer and/or the oxide (D). If the content of the sulfonic acid salt is less than 0.4 part by weight, the resulting resin composition will have insufficient antistatic properties. On the other hand, if its content is greater than 5 parts by weight, the resulting resin composition may become discolored when it undergoes a thermal history in an extruder, a molding machine or the like, develop form silvering in the surfaces of molded articles thereof, or show a reduction in strength and, in particular, impact strength.

The alkylsulfuric acid salts which can be represented by the above general formula and used as component (E) in the present invention include K, Na and $NH_4$ salts of sulfuric acid having an alkyl group of 8 to 20 carbon atoms. Typical examples of such alkylsulfuric acid salts are sodium octyl sulfate, sodium ethylhexyl sulfate, sodium undecyl sulfate, sodium dodecyl sulfate, potassium dodecyl sulfate and ammonium dodecyl sulfate. These alkylsulfuric acid salts may be used alone or in admixture of two or more.

The content of the alkylsulfuric acid salt is in the range of 0.4 to 5 parts by weight, preferably 0.7 to 4 parts by weight, per 100 parts by weight of the combined amount of the styrene resin (A), the polyethylene oxide (B), the styrene-acrylonitrile-hydroxyalkyl acrylate copolymer and/or the styrene-acrylonitrile-hydroxyalkyl methacrylate copolymer (C), and the (meth)acrylic ester polymer and/or the oxide (D). If the content of the alkylsulfuric acid salt is less than 0.4 part by weight, the resulting resin composition will have insufficient antistatic properties. On the other hand, if its content is greater than 5 parts by weight, the resulting resin composition may become discolored when it undergoes a thermal history in an extruder, a molding machine or the like, develop silvering in the surfaces of molded articles thereof, or show a reduction in strength and, in particular, impact strength.

The (poly)ethylene glycols which can be used as component (F) in the present invention have an average molecular weight of 62 to 1,200. Specific examples thereof include ethylene glycol, diethylene glycol, triethylene glycol, and low-molecular weight polyethylene glycols having an average molecular weight of 200, 300, 400, 600 or 1,000. These (poly)ethylene glycols may be used alone or in admixture of two or more. If the average molecular weight is outside the aforesaid limits, the resulting resin composition will have insufficient antistatic properties. The content of the (poly) ethylene glycol is in the range of 0.05 to 5 parts by weight, preferably 0.3 to 2 parts by weight, per 100 parts by weight of the combined amount of the styrene resin (A), the polyethylene oxide (B), the styrene-acrylonitrile-hydroxyalkyl acrylate copolymer and/or the styrene-acrylonitrile-hydroxyalkyl methacrylate copolymer (C), and the (meth)acrylic ester polymer and/or the oxide (D). If the content of the (poly)ethylene glycol is less than 0.05 part by weight, the resulting resin composition will have insufficient antistatic properties. On the other hand, if its content is greater than 5 parts by weight, the resulting resin composition will show a reduction in thermal resistance.

No particular limitation is placed on the method for preparing the resin compositions of the present invention. For example, they can be prepared by using a mixing machine such as single-screw extruder or Banbury mixer to melt and blend the above-described components of the present invention including the above-defined styrene resin, polyethylene oxide, styrene-acrylonitrile-hydroxyalkyl acrylate copolymer and/or styrene-acrylonitrile-hydroxyalkyl methacrylate copolymer, (meth)acrylic ester polymer and/or oxide, sulfonic acid salt or alkylsulfuric acid salt, and optional ethylene glycol or low-molecular-weight polyethylene glycol.

The resin compositions having excellent antistatic properties in accordance with the present invention may additionally contain a cationic, anionic or nonionic antistatic agent to further improve their antistatic properties.

The concurrent use of conventional plasticizers, mold release agents, light stabilizers, antioxidants, flame retardants, colorants, stabilizers and the like will in no way prevent the effects of the present invention from being manifested.

The present invention is further illustrated by the following examples and comparative examples. In these examples and comparative examples, the following materials were used.

The styrene resin used was "Santac ST-42" (manufactured by Mitsui Toatsu Chemicals, Inc.).

The polyethylene oxides used were those having the following viscosity-average molecular weights.

10,000: "PEG 11000" (manufactured by Nippon Oil & Fats Co., Ltd.).
20,000: "PEG 20000" (manufactured by Sanyo Chemical Industries Ltd.).
150,000: "Alkox R-150" (manufactured by Meisei Chemical Works, Ltd.; having a number-average molecular weight of 100,000).
200,000: "Alkox R-400" (manufactured by Meisei Chemical Works, Ltd.).
300,000: "Alkox R-1000" (manufactured by Meisei Chemical Works, Ltd.; having a number-average molecular weight of 200,000).
400,000: "Alkox E-30" (manufactured by Meisei Chemical Works, Ltd.).
600,000: "Alkox E-45" (manufactured by Meisei Chemical Works, Ltd.).
1,100,000: "Alkox E-60" (manufactured by Meisei Chemical Works, Ltd.; having a number-average molecular weight of 1,000,000).
1,300,000: A mixture comprising 80% by weight of "Alkox E-60" (manufactured by Meisei Chemical Works, Ltd.) and 20% by weight of "Alkox E-75" (manufactured by Meisei Chemical Works, Ltd.).
2,200,000: "Alkox E-75" (manufactured by Meisei Chemical Works, Ltd.; having a number-average molecular weight of 1,500,000).

The (meth)acrylic ester polymers used were "Parapet HR" and "Parapet GF" (manufactured by Kuraray Co., Ltd.).

The styrene-acrylonitrile-hydroxyalkyl acrylate copolymer used was "Alkolizer AA" (manufactured by Meisei Chemical Works, Ltd.) and the styrene-acrylonitrile-hydroxyalkyl methacrylate copolymer used was "Alkolizer AB" (manufactured by Meisei Chemical Works, Ltd.).

The titanium oxide used was "Titanium Dioxide" [Anatase (first class grade chemical); manufactured by Kanto Chemical Co., Inc.). The zinc oxide used was "Zinc Oxide" (99.9%; manufactured by Aldrich Chemical Co., Ltd.). The magnesium oxide used was "Magnesium Dioxide" (special grade chemical; manufactured by Kanto Chemical Co., Inc.).

The sulfonic acid salt used was "Neulex Powder F" (sodium dodecylbenzenesulfonate; manufactured by Nippon Oil & Fats Co., Ltd.).

The alkylsulfuric acid salt used was "Sodium n-Dodecyl Sulfate (first class grade)" (manufactured by Kanto Chemical Co., Inc.).

The ethylene glycol used was a product of Mitsui Toatsu Chemicals, Inc., and the polyethylene glycols used were those having the following average molecular weights calculated by OH values.

200: "PEG 200" (manufactured by Nippon Oil & Fats Co., Ltd.).
1,000: "PEG 1000" (manufactured by Nippon Oil & Fats Co., Ltd.).
3,000: "PEG 4000" (manufactured by Nippon Oil & Fats Co., Ltd.).

Resin compositions were tested according to the following procedures.

1) Surface resistivity: A plate measuring 4 cm×4 cm×2 mm (thickness) was injection-molded (at a cylinder temperature of 220° C. and a mold temperature of 40° C.) and its surface resistivity was measured with a HIRESTA-IP (manufactured by Mitsubishi Petrochemical Co., Ltd.) under the following conditions.

(i) Immediately after molding: Immediately after molding, the plate was thoroughly washed with distilled water, freed of surface moisture, and then conditioned at 20% RH and 10° C. for 24 hours (at 50% RH and 23° C. for 24 hours in Examples 1–11 and Comparative Examples 1–10) prior to measurement.

(ii) After standing for 150 days: After molding, the plate was allowed to stand at 50% RH and 23° C. for 150 days. Then, it was thoroughly washed with distilled water, freed of surface moisture, and conditioned at 20% RH and 10° C. for 24 hours (or at 50% RH and 23° C. for 24 hours in Examples 1–11 and Comparative Examples 1–10) prior to measurement.

2) Izod impact strength (notched): This was measured according to ASTM D-256.

3) Vicat softening temperature: This was measured according to ASTM D-1525.

4) Molding appearance: A sample was allowed to reside in an injection molding machine (with a cylinder temperature of 240° C.) for 3 minutes and then molded into a plate measuring 4 cm×4 cm×2 mm (thickness). This plate was examined for surface discoloration and silvering by visual observation.

5) Resistance to hot water: A sample was molded into a plate measuring 4 cm×4 cm×2 mm (thickness) (at a cylinder temperature of 220° C. and a mold temperature of 40° C.).

This plate was immersed in hot water at 60° C. for 2 hours and then examined for surface whitening by visual obervation. This plate was examined for surface discoloration and silvering by visual observation, and ranked as follows:

|  | Point |
| --- | --- |
| No detection of change | 5 |
| Whitening of circumference of the plate | 3 |
| Whitening of whole plate | 1 |

6) Resistance to high temperature and humidity 1: A sample was molded into a plate measuring 4 cm×4 cm×2 mm (thickness) (at a cylinder temperature of 220° C. and a mold temperature of 40° C.). Using a thermo-hygrostatic chamber, this plate was allowed to stand at 60° C. and 90% RH for a week and then the number of surface blisters was counted by visual observation.

| Number of blistering | Point |
| --- | --- |
| 0 | 5 |
| 1–2 | 4 |
| 3–5 | 3 |
| 6–10 | 2 |
| 10 over | 1 |

7) Resistance to high temperature and humidity 2: A sample was molded into a plate measuring 4 cm×4 cm×2 mm (thickness) (at a cylinder temperature of 220° C. and a mold temperature of 40° C.). Using a thermo-hygrostatic chamber, this plate was allowed to stand at 65° C. and 98% RH for 2 days and then examined for surface blistering by visual observation.

8) Resistance to high temperature and humidity 3: A sample was molded into a plate measuring 4 cm×4 cm×2 mm (thickness) (at a cylinder temperature of 220° C. and a mold temperature of 40° C.). Using a thermo-hygrostatic chamber, this plate was treated according to JIS C-0028 and then examined for surface blistering by visual observation.

EXAMPLE 1

Using a tumbler, 100 parts by weight of a styrene resin ("Santac ST-42", manufactured by Mitsui Toatsu Chemicals, Inc.), 10 parts by weight of a polyethylene oxide having a viscosity-average molecular weight of 300,000 (a number-average molecular weight of 200,000) ("Alkox R-1000", manufactured by Meisei Chemical Works, Ltd.), 2 parts by weight of a hydroxyalkyl methacrylate copolymer ("Alkolizer AB", manufactured by Meisei Chemical Works, Ltd.), 40 parts by weight of a (meth)acrylic ester polymer ("Parapet HR", manufactured by Kuraray Co., Ltd.), and 3 parts by weight (i.e., 2 parts by weight per 100 parts by weight of the combined amount of the styrene resin, the polyethylene oxide, the hydroxyalkyl methacrylate copolymer and the (meth)acrylic ester polymer) of sodium dodecylbenzenesulfonate ("Neulex Powder F", manufactured by Nippon Oil & Fats Co., Ltd.) were blended for 15 minutes. Then, using a twin-screw extruder ("AS-30", manufactured by Nakaya), the resulting blend was melted, mixed and pelletized for use as a sample.

After this sample was dried at 80° C. for 3 hours, its surface resistivity, Izod impact strength, molding appearance, resistance to hot water, and resistance to high temperature and humidity 1–3 were measured according to the above-described procedures. The results thus obtained are shown in Table 1.

EXAMPLES 2–3 AND COMPARATIVE EXAMPLES 1–2

Resin compositions were prepared and evaluated in the same manner as in Example 1, except that the viscosity-average molecular weight of the polyethylene oxide was altered. The results thus obtained are shown in Table 1.

EXAMPLES 4–5 AND COMPARATIVE EXAMPLES 3–4

Resin compositions were prepared and evaluated in the same manner as in Example 1, except that the proportion of the polyethylene oxide was altered. The results thus obtained are shown in Table 1.

EXAMPLES 6–7 AND COMPARATIVE EXAMPLES 5–6

Resin compositions were prepared and evaluated in the same manner as in Example 1, except that the proportion of the hydroxyalkyl methacrylate copolymer was altered. The results thus obtained are shown in Table 1.

EXAMPLES 8–9 AND COMPARATIVE EXAMPLES 7–8

Resin compositions were prepared and evaluated in the same manner as in Example 1, except that the proportion of the (meth)acrylic ester polymer was altered. The results thus obtained are shown in Table 1.

EXAMPLES 10–11 AND COMPARATIVE EXAMPLES 9–10

Resin compositions were prepared and evaluated in the same manner as in Example 1, except that the proportion of the sodium dodecylbenzenesulfonate was altered. The results thus obtained are shown in Table 1.

EXAMPLE 12

Using a tumbler, a resin composition comprising 100 parts by weight of a styrene resin ("Santac ST-42", manufactured by Mitsui Toatsu Chemicals, Inc.), 10 parts by weight of a polyethylene oxide having a viscosity-average molecular weight of 300,000 ("Alkox R-1000", manufactured by Meisei Chemical Works, Ltd.), 2 parts by weight of a hydroxyalkyl methacrylate copolymer ("Alkolizer AB", manufactured by Meisei Chemical Works, Ltd.), and 40 parts by weight of a (meth)acrylic ester polymer ("Parapet GF", manufactured by Kuraray Co., Ltd.) was mixed with 3 parts by weight (i.e., 2 parts by weight per 100 parts by weight of the resin composition) of sodium dodecylbenzenesulfonate ("Neulex Powder F", manufactured by Nippon Oil & Fats Co., Ltd.) and 1.5 parts by weight (i.e., 1 part by weight per 100 parts by weight of the resin composition) of polyethylene glycol "PEG 200" (manufactured by Nippon Oil & Fat Co., Ltd.), and this mixture was blended for 15 minutes. Then, using a twin-screw extruder ("AS-30", manufactured by Nakaya), the resulting blend was melted, mixed and pelletized for use as a sample.

After this sample was dried at 80° C. for 3 hours, its surface resistivity, Izod impact strength, Vicat softening temperature, molding appearance, resistance to hot water, and resistance to high temperature and humidity 1–3 were measured according to the above-described procedures. The results thus obtained are shown in Table 2.

EXAMPLES 13–14 AND COMPARATIVE EXAMPLES 11–12

Resin compositions were prepared and evaluated in the same manner as in Example 12, except that the viscosity-average molecular weight of the polyethylene oxide was altered. The results thus obtained are shown in Table 2.

EXAMPLES 15–16 AND COMPARATIVE EXAMPLES 13–14

Resin compositions were prepared and evaluated in the same manner as in Example 12, except that the proportion of the polyethylene oxide was altered. The results thus obtained are shown in Table 2.

EXAMPLES 17–18 AND COMPARATIVE EXAMPLES 15–16

Resin compositions were prepared and evaluated in the same manner as in Example 12, except that the proportion of the hydroxyalkyl methacrylate copolymer was altered. The results thus obtained are shown in Table 2.

EXAMPLES 19–20 AND COMPARATIVE EXAMPLES 17–18

Resin compositions were prepared and evaluated in the same manner as in Example 12, except that the proportion of the (meth)acrylic ester polymer was altered. The results thus obtained are shown in Table 2.

EXAMPLES 21–22 AND COMPARATIVE EXAMPLES 19–20

Resin compositions were prepared and evaluated in the same manner as in Example 12, except that the proportion of the sodium dodecylbenzenesulfonate was altered. The results thus obtained are shown in Table 2.

EXAMPLES 23–24 AND COMPARATIVE EXAMPLE 21

Resin compositions were prepared and evaluated in the same manner as in Example 12, except that the type of the (poly)ethylene glycol was altered. The results thus obtained are shown in Table 2.

EXAMPLES 25–26 AND COMPARATIVE EXAMPLES 22–23

Resin compositions were prepared and evaluated in the same manner as in Example 12, except that the proportion of the (poly)ethylene glycol was altered. The results thus obtained are shown in Table 2.

EXAMPLE 27

Using a tumbler, 100 parts by weight of a styrene resin ("Santac ST-42", manufactured by Mitsui Toatsu Chemicals, Inc.), 10 parts by weight of a polyethylene oxide having a viscosity-average molecular weight of 300,000 ("Alkox R-1000", manufactured by Meisei Chemical Works, Ltd.), 2 parts by weight of a hydroxyalkyl acrylate copolymer ("Alkolizer AA", manufactured by Meisei Chemical Works, Ltd.), 40 parts by weight of a (meth)acrylic ester polymer ("Parapet GF", manufactured by Kuraray Co., Ltd.), and 3 parts by weight (i.e., 2 parts by weight per 100 parts by weight of the combined amount of the styrene resin, the polyethylene oxide, the hydroxyalkyl acrylate copolymer and the (meth)acrylic ester polymer) of sodium n-dodecyl sulfonate (manufactured by Kanto Chemical Co., Inc.) were blended for 15 minutes. Then, using a twin-screw extruder ("AS-30", manufactured by Nakaya), the resulting blend was melted, mixed and pelletized for use as a sample.

After this sample was dried at 80° C. for 3 hours, its surface resistivity, Izod impact strength, molding appearance, resistance to hot water, and resistance to high temperature and humidity 1–3 were measured according to the above-described procedures. The results thus obtained are shown in Table 3.

EXAMPLES 28–29 AND COMPARATIVE EXAMPLES 26–27

Resin compositions were prepared and evaluated in the same manner as in Example 27, except that the viscosity-average molecular weight of the polyethylene oxide was altered. The results thus obtained are shown in Table 3.

EXAMPLES 30–31 AND COMPARATIVE EXAMPLES 26–27

Resin compositions were prepared and evaluated in the same manner as in Example 27, except that the proportion of the polyethylene oxide was altered. The results thus obtained are shown in Table 3.

EXAMPLES 32–33 AND COMPARATIVE EXAMPLES 28–29

Resin compositions were prepared and evaluated in the same manner as in Example 27, except that the proportion of the hydroxyalkyl acrylate copolymer was altered. The results thus obtained are shown in Table 3.

EXAMPLES 34–35 AND COMPARATIVE EXAMPLES 30–31

Resin compositions were prepared and evaluated in the same manner as in Example 27, except that the proportion of the (meth)acrylic ester polymer was altered. The results thus obtained are shown in Table 3.

EXAMPLES 36–37 AND COMPARATIVE EXAMPLES 32–33

Resin compositions were prepared and evaluated in the same manner as in Example 27, except that the proportion of the sodium n-dodecyl sulfate was altered. The results thus obtained are shown in Table 3.

EXAMPLE 38

Using a tumbler, 100 parts by weight of a styrene resin ("Santac ST-42", manufactured by Mitsui Toatsu Chemicals, Inc.), 10 parts by weight of a polyethylene oxide having a viscosity-average molecular weight of 300,000 ("Alkox R-1000", manufactured by Meisei Chemical Works, Ltd.), 2 parts by weight of a hydroxyalkyl acrylate copolymer ("Alkolizer AA", manufactured by Meisei Chemical Works, Ltd.), 2.2 parts by weight of sodium dodecylbenzenesulfonate ("Neulex Powder F", manufactured by Nippon Oil & Fats Co., Ltd.), and 2.2 parts by weight of titanium oxide ("Titanium Dioxide", manufactured by Kanto Chemical Co., Inc.) were blended for 15 minutes. Then, using a twin-screw extruder ("AS-30", manufactured by Nakaya), the resulting blend was melted, mixed and pelletized for use as a sample.

After this sample was dried at 80° C. for 3 hours, its surface resistivity, Izod impact strength, molding appearance, resistance to hot water, and resistance to high temperature and humidity 1–3 were measured according to the above-described procedures. The results thus obtained are shown in Table 4.

EXAMPLES 39–40 AND COMPARATIVE EXAMPLES 34–35

Resin compositions were prepared and evaluated in the same manner as in Example 38, except that the viscosity-average molecular weight of the polyethylene oxide was altered. The results thus obtained are shown in Table 4.

EXAMPLES 41–42 AND COMPARATIVE EXAMPLES 36–37

Resin compositions were prepared and evaluated in the same manner as in Example 38, except that the proportion of the polyethylene oxide was altered. The results thus obtained are shown in Table 4.

EXAMPLES 43–44 AND COMPARATIVE EXAMPLES 38–39

Resin compositions were prepared and evaluated in the same manner as in Example 38, except that the proportion of the hydroxyalkyl acrylate copolymer was altered. The results thus obtained are shown in Table 4.

EXAMPLES 45–46 AND COMPARATIVE EXAMPLES 40–41

Resin compositions were prepared and evaluated in the same manner as in Example 38, except that the proportion of sodium dodecylbenezenesulfonate was altered. The results thus obtained are shown in Table 4.

EXAMPLES 47–48 AND COMPARATIVE EXAMPLES 42–43

Resin compositions were prepared and evaluated in the same manner as in Example 38, except that the proportion of titanium oxide was altered. The results thus obtained are shown in Table 4.

EXAMPLES 49–50

Resin compositions were prepared and evaluated in the same manner as in Example 38, except that the titanium oxide was replaced by zinc oxide or a mixture of titanium oxide and zinc oxide. The results thus obtained are shown in Table 4.

EXAMPLES 51–62

Using a tumbler, a resin composition comprising 100 parts by weight of a styrene resin ("Santac ST-42", manufactured by Mitsui Toatsu Chemicals, Inc.), 10 parts by weight of a polyethylene oxide having a viscosity-average molecular weight of 300,000 ("Alkox R-1000", manufactured by Meisei Chemical Works, Ltd.), 2 parts by weight of a hydroxyalkyl methacrylate copolymer ("Alkolizer AB", manufactured by Meisei Chemical Works, Ltd.), 40 parts by weight of a (meth)acrylic ester copolymer, and the type and amount of oxide shown in Table 5 was mixed with sodium dodecylbenzenesulfonate (Neulex Powder F", manufactured by Nippon Oil & Fats Co., Ltd.) or sodium n-dodecyl sulfate (manufactured by Kanto Chemical Co., Ltd.) in the amount shown in Table 5 and a polyethylene glycol ("PEG 200", manufactured by Nippon Oil & Fats Co., Ltd.) in the amount shown in Table 5, and this mixture was blended for 15 minutes. Then, using a twin-screw extruder ("AS-30", manufactured by Nakaya), the resulting blend was melted, mixed and pelletized for use as a sample. After this sample was dried at 80° C. for 3 hours, its surface resistivity, Izod impact strength, Vicat softening temperature, molding appearance, resistance to hot water, and resistance to high temperature and humidity 1–3 were measured. The results thus obtained are shown in Table 5.

As is evident from the results shown in Tables 1–5, the resin compositions of the present invention have excellent antistatic properties and improved practical physical properties.

TABLE 1

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Resin composition | Cont. (pbw) of styrene Polymer (A) | | 100 | 100 | 100 | 100 | 100 | 100 | 100 | 100 | 100 | 100 | 100 |
| | Polyethyene oxide (B) | M.W. (×$10^4$) | 30 | 110 | 15 | 30 | 30 | 30 | 30 | 30 | 30 | 30 | 30 |
| | | cont. (pbw) | 10 | 10 | 10 | 5 | 30 | 10 | 10 | 10 | 10 | 10 | 10 |
| | Cont. (pbw) of hydroxyalkyl methacrylate copolymer (C) | | 2 | 2 | 2 | 2 | 2 | 0.5 | 8 | 2 | 2 | 2 | 2 |
| | Cont. (pbw) of (meth)acrylate ester polymer (D) | | 40 | 40 | 40 | 40 | 40 | 40 | 40 | 5 | 80 | 40 | 40 |
| | Cont. of sulfonic acid salt [pbw per 100 pbw of (A) + (B) + (C) + (D)] | | 2 | 2 | 2 | 2 | 2 | 2 | 2 | 2 | 2 | 0.5 | 4 |
| Physical properties | Surface resistivity (Ω) | Immediately after molding | $7 \times 10^9$ | $1 \times 10^{11}$ | $8 \times 10^{10}$ | $9 \times 10^{11}$ | $4 \times 10^9$ | $8 \times 10^9$ | $6 \times 10^{11}$ | $1 \times 10^{10}$ | $6 \times 10^9$ | $7 \times 10^{11}$ | $3 \times 10^9$ |
| | | After standing for 105 days | $3 \times 10^9$ | $1 \times 10^{11}$ | $6 \times 10^{10}$ | $7 \times 10^{11}$ | $2 \times 10^9$ | $9 \times 10^{10}$ | $5 \times 10^9$ | $1 \times 10^9$ | $8 \times 10^{11}$ | $6 \times 10^9$ | |
| | Izod impact strength (kg · cm/cm) | | 12 | 11 | 12 | 13 | 10 | 13 | 10 | 14 | 10 | 12 | 12 |
| Molding appearance (discoloration and silvering) | | | good | good | good | good | good | good | good | good | good | good | good |
| Resistance to hot water | | | 5 | 5 | 5 | 5 | 5 | 5 | 5 | 5 | 5 | 5 | 5 |
| Resistance to high temperature and humidity 1 | | | 5 | 5 | 5 | 5 | 5 | 5 | 5 | 5 | 5 | 5 | 5 |
| Resistance to high temperature and humidity 2 | | | 5 | 5 | 5 | 5 | 5 | 5 | 5 | 5 | 5 | 5 | 5 |
| Resistance to high temperature and humidity 3 | | | 5 | 5 | 5 | 5 | 5 | 5 | 5 | 5 | 5 | 5 | 5 |

| | | | Comparative Example | | | | | | | | | |
|---|---|---|---|---|---|---|---|---|---|---|---|---|
| | | | 1 | 2 | 3 | 4 | 5 | 6 | 7 | 8 | 9 | 10 |
| Resin composition | Cont. (pbw) of styrene Polymer (A) | | 100 | 100 | 100 | 100 | 100 | 100 | 100 | 100 | 100 | 100 |
| | Polyethyene oxide (B) | M.W. (×$10^4$) | 1 | 220 | 30 | 30 | 30 | 30 | 30 | 30 | 30 | 30 |
| | | cont. (pbw) | 10 | 10 | 2 | 40 | 10 | 10 | 10 | 10 | 10 | 10 |
| | Cont. (pbw) of hydroxyalkyl methacrylate copolymer (C) | | 2 | 2 | 2 | 2 | 0.05 | 20 | 2 | 2 | 2 | 2 |
| | Cont. (pbw) of (meth)acrylate ester polymer (D) | | 40 | 40 | 40 | 40 | 40 | 40 | 40 | 120 | 40 | 40 |
| | Cont. of sulfonic acid salt [pbw per 100 pbw of (A) + (B) + (C) + (D)] | | 2 | 2 | 2 | 2 | 2 | 2 | 2 | 2 | 0.2 | 7 |
| Physical properties | Surface resistivity (Ω) | Immediately after molding | $3 \times 15^9$ | $7 \times 13^{11}$ | $8 \times 10^{14}$ | $7 \times 10^9$ | $4 \times 10^9$ | $6 \times 10^{13}$ | $7 \times 10^9$ | $8 \times 10^9$ | $7 \times 10^{13}$ | $6 \times 10^9$ |
| | | After standing for 105 days | $5 \times 10^{15}$ | $5 \times 14^{11}$ | $8 \times 10^{15}$ | $3 \times 10^9$ | $2 \times 10^{10}$ | $7 \times 10^{15}$ | $3 \times 10^9$ | $5 \times 10^9$ | $5 \times 14^{11}$ | $1 \times 10^9$ |
| | Izod impact strength (kg · cm/cm) | | 12 | 9 | 13 | 4 | 13 | 6 | 13 | 6 | 12 | 12 |
| Molding appearance (discoloration and silvering) | | | good | good | good | good | good | good | good | good | good | poor |
| Resistance to hot water | | | 5 | 5 | 5 | 5 | 5 | 5 | 1 | 5 | 5 | 5 |

TABLE 1-continued

| | | | | | | | | | | |
|---|---|---|---|---|---|---|---|---|---|---|
| Resistance to high temperature and humidity 1 | 5 | 5 | 5 | 5 | 5 | 3 | 5 | 5 | 5 | 5 |
| Resistance to high temperature and humidity 2 | 5 | 5 | 5 | 5 | 5 | 3 | 5 | 5 | 5 | 5 |
| Resistance to high temperature and humidity 3 | 5 | 5 | 5 | 5 | 5 | 2 | 5 | 5 | 5 | 5 |

TABLE 2

| | | | Example |  |  |  |  |  |  |  |  |  |  |  |  |
|---|---|---|---|---|---|---|---|---|---|---|---|---|---|---|---|
| | | | 12 | 13 | 14 | 15 | 16 | 17 | 18 | 19 | 20 | 21 | 22 | 23 | 24 | 25 | 26 |
| Resin composition | Cont. (pbw) of styrene Polymer (A) | | 100 | 100 | 100 | 100 | 100 | 100 | 100 | 100 | 100 | 100 | 100 | 100 | 100 | 100 | 100 |
| | Polyethylene oxide (B) | Viscosity-average M.W. (×10⁴) | 30 | 15 | 2 | 30 | 30 | 30 | 30 | 30 | 30 | 30 | 30 | 30 | 30 | 30 | 30 |
| | | cont. (pbw) | 10 | 10 | 10 | 5 | 30 | 10 | 10 | 10 | 10 | 10 | 10 | 10 | 10 | 10 | 10 |
| | Cont. (pbw) of hydroxalkyl methacrylate copolymer (C) | | 2 | 2 | 2 | 2 | 2 | 0.5 | 8 | 2 | 2 | 2 | 2 | 2 | 2 | 2 | 2 |
| | Cont. (pbw) of (meth)acrylic ester polymer (D) | | 40 | 40 | 40 | 40 | 40 | 40 | 40 | 5 | 80 | 40 | 40 | 40 | 40 | 40 | 40 |
| | Cont. of sulfonic acid salt [pbw per 100 pbw of (A)+(B)+(C)+(D)] | | 2 | 2 | 2 | 2 | 2 | 2 | 2 | 2 | 2 | 0.5 | 4 | 2 | 2 | 2 | 2 |
| | (Poly)-ethylene glycol | Type | PEG 200 | PEG 200 | PEG 200 | PEG 200 | PEG 200 | PEG 200 | PEG 200 | PEG 200 | PEG 200 | PEG 200 | PEG 200 | ethylene glycol | PEG 1000 | PEG 200 | PEG 200 |
| | | Cont. [pbw per 100 pbw of (A)+(B)+(C)+(D)] | 1 | 1 | 1 | 1 | 1 | 1 | 1 | 1 | 1 | 1 | 1 | 1 | 1 | 0.1 | 3 |
| Physical properties | Surface resistivity (Ω) | Immediately after molding | $4 \times 10^9$ | $2 \times 10^9$ | $2 \times 10^{10}$ | $7 \times 10^{10}$ | $1 \times 10^9$ | $2 \times 10^9$ | $3 \times 10^{10}$ | $6 \times 10^9$ | $8 \times 10^9$ | $6 \times 10^{11}$ | $1 \times 10^9$ | $6 \times 10^9$ | $6 \times 10^9$ | $4 \times 10^9$ | $3 \times 10^9$ |
| | | After standing for 150 days | $3 \times 10^9$ | $1 \times 10^9$ | $9 \times 10^9$ | $5 \times 10^{10}$ | $1 \times 10^9$ | $1 \times 10^9$ | $1 \times 10^{10}$ | $3 \times 10^9$ | $7 \times 10^9$ | $2 \times 10^9$ | $1 \times 10^9$ | $5 \times 10^9$ | $6 \times 10^9$ | $3 \times 10^9$ | $2 \times 10^9$ |
| | Izod impact strength (kg·cm/cm) | | 12 | 12 | 11 | 13 | 10 | 15 | 10 | 13 | 10 | 12 | 12 | 12 | 11 | 12 | 13 |
| | Vicat softening temperature (°C) | | 105 | 105 | 104 | 105 | 103 | 105 | 105 | 105 | 105 | 105 | 105 | 105 | 105 | 105 | 104 |
| Molding appearance (discoloration and silvering) | | | good | good | good | good | good | good | good | good | good | good | good | good | good | good | good |
| Resistance to hot water | | | 5 | 5 | 5 | 5 | 5 | 5 | 5 | 5 | 5 | 5 | 5 | 5 | 5 | 5 | 5 |
| Resistance to high temperature and humidity 1 | | | 5 | 5 | 5 | 5 | 5 | 5 | 5 | 5 | 5 | 5 | 5 | 5 | 5 | 5 | 5 |
| Resistance to high temperature and humidity 2 | | | 5 | 5 | 5 | 5 | 5 | 5 | 5 | 5 | 5 | 5 | 5 | 5 | 5 | 5 | 5 |
| Resistance to high temperature and humidity 3 | | | 5 | 5 | 5 | 5 | 5 | 5 | 5 | 5 | 5 | 5 | 5 | 5 | 5 | 5 | 5 |

| | | | Comparative Example |  |  |  |  |  |  |  |  |  |  |  |  |
|---|---|---|---|---|---|---|---|---|---|---|---|---|---|---|---|
| | | | 11 | 12 | 13 | 14 | 15 | 16 | 17 | 18 | 19 | 20 | 21 | 22 | 23 |
| Resin composition | Cont. (pbw) of styrene Polymer (A) | | 100 | 100 | 100 | 100 | 100 | 100 | 100 | 100 | 100 | 100 | 100 | 100 | 100 |
| | Polyethylene oxide (B) | Viscosity-average M.W. (×10⁴) | 1 | 220 | 30 | 30 | 30 | 30 | 30 | 30 | 30 | 30 | 30 | 30 | 30 |
| | | cont. (pbw) | 10 | 10 | 2 | 40 | 10 | 10 | 10 | 10 | 10 | 10 | 10 | 10 | 10 |
| | Cont. (pbw) of hydroxalkyl methacrylate copolymer (C) | | 2 | 2 | 2 | 2 | 0.05 | 20 | 2 | 120 | 2 | 2 | 2 | 2 | 2 |
| | Cont. (pbw) of (meth)acrylic | | 40 | 40 | 40 | 40 | 40 | 40 | 3 | | 40 | 40 | 40 | 40 | 40 |

TABLE 2-continued

| | 1 | 2 | 3 | 4 | 5 | 6 | 7 | 8 | 9 | 10 | 11 | 12 | 13 |
|---|---|---|---|---|---|---|---|---|---|---|---|---|---|
| ester polymer (D) Cont. of sulfonic acid salt [pbw per 100 pbw of (A)+(B)+(C)+(D)] | 2 | 2 | 2 | 2 | 2 | 2 | 2 | 2 | 0.2 | 7 | 2 | 2 | 2 |
| (Poly)-ethylene glycol Type | PEG 200 | PEG 200 | PEG 200 | PEG 200 | PEG 200 | PEG 200 | PEG 200 | PEG 200 | PEG 200 | PEG 200 | PEG 4000 | — | PEG 200 |
| Cont. [pbw per 100 pbw of (A)+(B)+(C)+(D)] | 1 | 1 | 1 | 1 | 1 | 1 | 1 | 1 | 1 | 1 | 1 | 0 | 7 |
| Physical properties Surface resistivity (Ω) Immediately after molding | $2 \times 10^{15}$ | $6 \times 10^{13}$ | $6 \times 10^{14}$ | $5 \times 10^{9}$ | $5 \times 10^{9}$ | $5 \times 10^{14}$ | $6 \times 10^{9}$ | $8 \times 10^{9}$ | $6 \times 10^{13}$ | $5 \times 10^{9}$ | $6 \times 10^{12}$ | $3 \times 10^{12}$ | $6 \times 10^{9}$ |
| After standing for 150 days | $4 \times 10^{15}$ | $3 \times 10^{14}$ | $5 \times 10^{15}$ | $3 \times 10^{9}$ | $2 \times 10^{10}$ | $6 \times 10^{15}$ | $5 \times 10^{9}$ | $4 \times 10^{9}$ | $4 \times 10^{14}$ | $3 \times 10^{9}$ | $9 \times 10^{12}$ | $1 \times 10^{13}$ | $2 \times 10^{9}$ |
| Izod impact strength (kg·cm/cm) | 12 | 9 | 13 | 5 | 14 | 6 | 13 | 5 | 12 | 12 | 11 | 12 | 8 |
| Vicat softening temperature (°C) | 105 | 105 | 107 | 105 | 105 | 105 | 105 | 105 | 105 | 103 | 105 | 106 | 102 |
| Molding appearance (discoloration and silvering) | good | good | good | good | good | good | good | good | good | good | good | good | good |
| Resistance to hot water | 5 | 5 | 5 | 5 | 5 | 5 | 1 | 5 | 5 | 5 | 5 | 5 | 5 |
| Resistance to high temperature and humidity 1 | 5 | 5 | 5 | 5 | 2 | 5 | 5 | 5 | 5 | 5 | 5 | 5 | 5 |
| Resistance to high temperature and humidity 2 | 5 | 5 | 5 | 5 | 2 | 5 | 4 | 5 | 5 | 5 | 5 | 5 | 5 |
| Resistance to high temperature and humidity 3 | 5 | 5 | 5 | 5 | 2 | 5 | 4 | 5 | 5 | 5 | 5 | 5 | 5 |

TABLE 3

| | | Example | | | | | | | | | | | |
|---|---|---|---|---|---|---|---|---|---|---|---|---|
| | | 27 | 28 | 29 | 30 | 31 | 32 | 33 | 34 | 35 | 36 | 37 |
| Resin composition | Cont. (pbw) of styrene Polymer (A) | 100 | 100 | 100 | 100 | 100 | 100 | 100 | 100 | 100 | 100 | 100 |
| | Polyethylene oxide (B) Viscosity-average M.W. (×10$^4$) | 30 | 110 | 15 | 30 | 30 | 30 | 30 | 30 | 30 | 30 | 30 |
| | cont. (pbw) | 10 | 10 | 10 | 5 | 30 | 10 | 10 | 10 | 10 | 10 | 10 |
| | Cont. (pbw) of hydroxyalkyl methacrylate copolymer (C) | 2 | 2 | 2 | 2 | 2 | 0.5 | 8 | 2 | 2 | 2 | 2 |
| | Cont. (pbw) of (meth)acrylic ester polymer (D) | 40 | 40 | 40 | 40 | 40 | 40 | 40 | 5 | 80 | 40 | 40 |
| | Cont. of sodium n-dodecyl sulfate [pbw per 100 pbw of (A)+(B)+(C)+(D)] | 2 | 2 | 2 | 2 | 2 | 2 | 2 | 2 | 2 | 0.5 | 4 |
| Physical properties | Surface resistivity (Ω) Immediately after molding | 9×10$^9$ | 3×10$^{11}$ | 2×10$^{10}$ | 8×10$^{11}$ | 5×10$^9$ | 7×10$^9$ | 3×10$^{10}$ | 1×10$^{10}$ | 5×10$^{10}$ | 9×10$^{11}$ | 1×10$^9$ |
| | After standing for 150 days | 5×10$^9$ | 1×10$^{11}$ | 7×10$^9$ | 6×10$^{11}$ | 2×10$^9$ | 7×10$^9$ | 2×10$^{10}$ | 8×10$^9$ | 8×10$^9$ | 7×10$^{11}$ | 1×10$^9$ |
| | Izod impact strength (kg·cm/cm) | 12 | 12 | 13 | 13 | 10 | 13 | 10 | 14 | 10 | 13 | 11 |
| | Molding appearance (discoloration and silvering) | good | good | good | good | good | good | good | good | good | good | good |
| | Resistance to hot water | 5 | 5 | 5 | 5 | 5 | 5 | 5 | 5 | 5 | 5 | 5 |
| | Resistance to high temperature and humidity 1 | 5 | 5 | 5 | 5 | 5 | 5 | 5 | 5 | 5 | 5 | 5 |
| | Resistance to high temperature and humidity 2 | 5 | 5 | 5 | 5 | 5 | 5 | 5 | 5 | 5 | 5 | 5 |
| | Resistance to high temperature and humidity 3 | 5 | 5 | 5 | 5 | 5 | 5 | 5 | 5 | 5 | 5 | 5 |

| | | Comparative Example | | | | | | | | | |
|---|---|---|---|---|---|---|---|---|---|---|---|
| | | 24 | 25 | 26 | 27 | 28 | 29 | 30 | 31 | 32 | 33 |
| Resin composition | Cont. (pbw) of styrene Polymer (A) | 100 | 100 | 100 | 100 | 100 | 100 | 100 | 100 | 100 | 100 |
| | Polyethylene oxide (B) Viscosity-average M.W. (×10$^4$) | 1 | 220 | 30 | 30 | 30 | 30 | 30 | 30 | 30 | 30 |
| | cont. (pbw) | 10 | 10 | 2 | 40 | 10 | 10 | 10 | 10 | 10 | 10 |
| | Cont. (pbw) of hydroxyalkyl methacrylate copolymer (C) | 2 | 2 | 2 | 2 | 0.05 | 20 | 2 | 2 | 2 | 2 |
| | Cont. (pbw) of (meth)acrylic ester polymer (D) | 40 | 40 | 40 | 40 | 40 | 40 | 3 | 120 | 40 | 40 |
| | Cont. of sodium n-dodecyl sulfate [pbw per 100 pbw of (A)+(B)+(C)+(D)] | 2 | 2 | 2 | 2 | 2 | 2 | 2 | 2 | 0.2 | 7 |
| Physical properties | Surface resistivity (Ω) Immediately after molding | 3×10$^{15}$ | 7×10$^{15}$ | 1×10$^{16}$ | 4×10$^9$ | 9×10$^9$ | 9×10$^{10}$ | 3×10$^9$ | 5×10$^{11}$ | 2×10$^{14}$ | 7×10$^9$ |
| | After standing for 150 days | 2×10$^{15}$ | 4×10$^{15}$ | 8×10$^{15}$ | 1×10$^9$ | 6×10$^9$ | 6×10$^{10}$ | 1×10$^9$ | 2×10$^{11}$ | 9×10$^{13}$ | 4×10$^9$ |
| | Izod impact strength (kg·cm/cm) | 13 | 8 | 15 | 6 | 12 | 4 | 16 | 5 | 12 | 10 |
| | Molding appearance (discoloration and silvering) | good | good | good | good | good | good | good | good | good | good |
| | Resistance to hot water | 5 | 5 | 5 | 5 | 5 | 5 | 1 | 5 | 5 | 5 |

TABLE 3-continued

| | | | | | | | | | | |
|---|---|---|---|---|---|---|---|---|---|---|
| Resistance to high temperature and humidity 1 | 5 | 5 | 5 | 5 | 5 | 2 | 5 | 5 | 5 | 5 |
| Resistance to high temperature and humidity 2 | 5 | 5 | 5 | 5 | 5 | 2 | 5 | 5 | 5 | 5 |
| Resistance to high temperature and humidity 3 | 5 | 5 | 5 | 5 | 5 | 2 | 5 | 5 | 5 | 5 |

TABLE 4

| | | Example | | | | | | | | | | | | |
|---|---|---|---|---|---|---|---|---|---|---|---|---|---|---|
| | | 38 | 39 | 40 | 41 | 42 | 43 | 44 | 45 | 46 | 47 | 48 | 49 | 50 |
| Resin composition | Cont. (pbw) of styrene Polymer (A) | 100 | 100 | 100 | 100 | 100 | 100 | 100 | 100 | 100 | 100 | 100 | 100 | 100 |
| | Polyethylene oxide (B) M.W. (×10⁴) | 30 | 110 | 15 | 30 | 30 | 30 | 30 | 30 | 30 | 30 | 30 | 30 | 30 |
| | cont. (pbw) | 10 | 10 | 10 | 5 | 30 | 10 | 10 | 10 | 10 | 10 | 10 | 10 | 10 |
| | Cont. (pbw) of hydroxyalkyl acrylate copolymer (C) | 2 | 2 | 2 | 2 | 2 | 0.5 | 8 | 2 | 2 | 2 | 2 | 2 | 2 |
| | Cont. of sulfonic acid salt [pbw per 100 pbw of (A) + (B) + (C)] | 2 | 2 | 2 | 2 | 2 | 2 | 2 | 0.5 | 4 | 2 | 2 | 2 | 2 |
| | Cont. of titanium oxide salt [pbw per 100 pbw of (A) + (B)] | 2 | 2 | 2 | 2 | 2 | 2 | 2 | 2 | 2 | 1 | 4 | 0 | 1 |
| | Cont. of zinc oxide [pbw per 100 pbw of (A) + (B)] | 0 | 0 | 0 | 0 | 0 | 0 | 0 | 0 | 0 | 0 | 0 | 2 | 1 |
| Physical properties | Surface resistivity (Ω) Immediately after molding | 8 × 10⁹ | 7 × 10⁹ | 2 × 10¹⁰ | 9 × 10¹¹ | 8 × 10⁹ | 8 × 10⁹ | 2 × 10¹⁰ | 3 × 10¹¹ | 6 × 10⁹ | 7 × 10⁹ | 6 × 10⁹ | 7 × 10⁹ | 8 × 10⁹ |
| | After standing of 150 days | 2 × 10¹⁰ | 3 × 10¹⁰ | 8 × 10⁹ | 6 × 10¹⁰ | 4 × 10⁹ | 9 × 10⁹ | 1 × 10¹⁰ | 7 × 10¹¹ | 3 × 10⁹ | 1 × 10¹⁰ | 9 × 10⁹ | 2 × 10¹⁰ | 3 × 10¹⁰ |
| | Izod impact strength (kg · cm/cm) | 11 | 11 | 12 | 12 | 10 | 12 | 10 | 13 | 10 | 12 | 10 | 11 | 11 |
| | Molding appearance (discoloration and silvering) | good | good | good | good | good | good | good | good | good | good | good | good | good |
| | Resistance to hot water | 5 | 5 | 5 | 5 | 5 | 5 | 5 | 5 | 5 | 5 | 5 | 5 | 5 |
| | Resistance to high temperature and humidity 1 | 5 | 5 | 5 | 5 | 5 | 5 | 5 | 5 | 5 | 5 | 5 | 5 | 5 |
| | Resistance to high temperature and humidity 2 | 5 | 5 | 5 | 5 | 5 | 5 | 5 | 5 | 5 | 5 | 5 | 5 | 5 |
| | Resistance to high temperature and humidity 3 | 5 | 5 | 5 | 5 | 5 | 5 | 5 | 5 | 5 | 5 | 5 | 5 | 5 |

| | | Comparative Example | | | | | | | | | |
|---|---|---|---|---|---|---|---|---|---|---|---|
| | | 34 | 35 | 36 | 37 | 38 | 39 | 40 | 41 | 42 | 43 |
| Resin composition | Cont. (pbw) of styrene Polymer (A) | 100 | 100 | 100 | 100 | 100 | 100 | 100 | 100 | 100 | 100 |
| | Polyethylene oxide (B) M.W. (×10⁴) | 1 | 220 | 30 | 30 | 30 | 30 | 30 | 30 | 30 | 30 |
| | cont. (pbw) | 10 | 10 | 2 | 40 | 10 | 10 | 10 | 10 | 10 | 10 |
| | Cont. (pbw) of hydroxyalkyl acrylate copolymer (C) | 2 | 2 | 2 | 2 | 0.05 | 20 | 2 | 7 | 4 | 2 |
| | Cont. of sulfonic acid salt [pbw per 100 pbw of (A) + (B) + (C)] | 2 | 2 | 2 | 2 | 2 | 2 | 0.2 | 2 | 4 | 4 |
| | Cont. of titanium oxide salt [pbw per 100 pbw of (A) + (B)] | 2 | 2 | 2 | 2 | 2 | 2 | 2 | 2 | 0.5 | 7 |
| | Cont. of zinc oxide [pbw per 100 pbw of (A) + (B)] | 0 | 0 | 0 | 0 | 0 | 0 | 0 | 0 | 0 | 0 |
| Physical properties | Surface resistivity (Ω) Immediately after molding | 4 × 10¹⁵ | 9 × 10¹⁵ | 2 × 10¹⁶ | 2 × 10⁹ | 9 × 10⁹ | 2 × 10¹⁰ | 3 × 10¹⁴ | 7 × 10⁹ | 5 × 10⁹ | 8 × 10⁹ |
| | After standing of 150 days | 7 × 10¹⁵ | 5 × 10¹⁵ | 7 × 10¹⁵ | 5 × 10⁹ | 6 × 10⁹ | 9 × 10⁹ | 9 × 10¹³ | 4 × 10¹⁰ | 2 × 10¹⁰ | 4 × 10¹⁰ |

TABLE 4-continued

| Izod impact strength (kg · cm/cm) | 13 | 8 | 15 | 14 | 4 | 12 | 10 | 12 | 4 |
|---|---|---|---|---|---|---|---|---|---|
| Molding appearance (discoloration and silvering) | good | good | good | good | good | good | poor | good | good |
| Resistance to hot water | 5 | 5 | 5 | 5 | 5 | 5 | 5 | 1 | 5 |
| Resistance to high temperature and humidity 1 | 5 | 5 | 5 | 2 | 5 | 5 | 5 | 5 | 5 |
| Resistance to high temperature and humidity 2 | 5 | 5 | 5 | 2 | 5 | 5 | 5 | 5 | 5 |
| Resistance to high temperature and humidity 3 | 5 | 5 | 5 | 2 | 5 | 5 | 5 | 5 | 5 |

TABLE 5

| Example | | | 51 | 52 | 53 | 54 | 55 | 56 |
|---|---|---|---|---|---|---|---|---|
| Resin composition | Cont. (pbw) of styrene Polymer (A) | | 100 | 100 | 100 | 100 | 100 | 100 |
| | Polyethylene oxide (B) | Viscosity-average M.W. (×10$^4$) | 30 | 30 | 30 | 30 | 30 | 30 |
| | | cont. (pbw) | 10 | 10 | 10 | 10 | 10 | 10 |
| | Cont. (pbw) of hydroxyalkyl methacrylate copolymer (C) | | 2 | 2 | 2 | 2 | 2 | 2 |
| | Cont. (pbw) of (meth)acrylic ester polymer (D) | | 40 | 40 | 40 | 40 | 40 | 40 |
| | Cont. of titanium oxide [pbw per 100 pbw of (A) + (B)] | | 2 | 0 | 1 | 2 | 2 | 2 |
| | Cont. of zinc oxide [pbw per 100 pbw of (A) + (B)] | | 0 | 0 | 1 | 0 | 0 | 0 |
| | Cont. of magnesium oxide [pbw per 100 pbw of (A) + (B)] | | 0 | 2 | 0 | 0 | 0 | 0 |
| | Cont. of sulfonic acid salt [pbw per 100 pbw of (A) + (B) + (C) + (D)] | | 2 | 2 | 2 | 0 | 2 | 0 |
| | Cont of alkylsulfuric acid salt per 100 pbw of (A) + (B) + (C) + (D)] | | 0 | 0 | 0 | 2 | 0 | 2 |
| | (Poly)-ethylene glycol | Type | | | | | PEG 200 | PEG 200 |
| | | Cont. [pbw per 100 pbw of (A) + (B) + (C) + (D)] | 0 | 0 | 0 | 0 | 1 | 1 |
| Physical properties | Surface resistivity (Ω) | Immediately after molding | $8 \times 10^{11}$ | $7 \times 10^{11}$ | $1 \times 10^{12}$ | $2 \times 10^{10}$ | $9 \times 10^{11}$ | $9 \times 10^9$ |
| | | After standing for 150 days | $6 \times 10^{11}$ | $6 \times 10^{11}$ | $8 \times 10^{11}$ | $9 \times 10^9$ | $8 \times 10^{11}$ | $6 \times 10^9$ |
| | Izod impact strength (kg · cm/cm) | | 12 | 12 | 12 | 12 | 12 | 12 |
| Vicat softening temperature (°C.) | | | 105 | 105 | 105 | 105 | 105 | 105 |
| Molding appearance (discoloration and silvering) | | | good | good | good | good | good | good |
| Resistance to hot water | | | 5 | 5 | 5 | 5 | 5 | 5 |
| Resistance to high temperature and humidity 1 | | | 5 | 5 | 5 | 5 | 5 | 5 |
| Resistance to high temperature and humidity 2 | | | 5 | 5 | 5 | 5 | 5 | 5 |
| Resistance to high temperature and humidity 3 | | | 5 | 5 | 5 | 5 | 5 | 5 |

| Example | | | 57 | 58 | 59 | 60 | 61 | 62 |
|---|---|---|---|---|---|---|---|---|
| Resin composition | Cont. (pbw) of styrene Polymer (A) | | 100 | 100 | 100 | 100 | 100 | 100 |
| | Polyethylene oxide (B) | Viscosity-average M.W. (×10$^4$) | 30 | 30 | 30 | 30 | 30 | 30 |
| | | cont. (pbw) | 10 | 10 | 10 | 10 | 10 | 10 |
| | Cont. (pbw) of hydroxyalkyl methacrylate copolymer (C) | | 2 | 2 | 2 | 2 | 2 | 2 |
| | Cont. (pbw) of (meth)acrylic ester polymer (D) | | 40 | 0 | 0 | 0 | 0 | 0 |
| | Cont. of titanium oxide [pbw per 100 pbw of (A) + (B)] | | 0 | 2 | 2 | 2 | 0 | 1 |
| | Cont. of zinc oxide [pbw per 100 pbw of (A) + (B)] | | 0 | 0 | 0 | 0 | 0 | 0.5 |
| | Cont. of magnesium oxide [pbw per 100 pbw of (A) + (B)] | | 0 | 2 | 0 | 0 | 2 | 0.5 |
| | Cont. of sulfonic acid salt [pbw per 100 pbw of (A) + (B) + (C) + (D)] | | 0 | 0 | 0 | 2 | 2 | 2 |
| | Cont of alkylsulfuric acid salt per 100 pbw of (A) + (B) + (C) + (D)] | | 2 | 2 | 2 | 0 | 0 | 0 |
| | (Poly)-ethylene glycol | Type | PEG 200 | | PEG 200 | PEG 200 | | |
| | | Cont. [pbw per 100 pbw of (A) + (B) + (C) + (D)] | 1 | 0 | 1 | 1 | 0 | 0 |
| Physical properties | Surface resistivity (Ω) | Immediately after molding | $5 \times 10^9$ | $2 \times 10^9$ | $6 \times 10^9$ | $4 \times 10^9$ | $8 \times 10^9$ | $7 \times 10^9$ |
| | | After standing for 150 days | $2 \times 10^9$ | $7 \times 10^9$ | $7 \times 10^9$ | $6 \times 10^9$ | $6 \times 10^9$ | $3 \times 10^{10}$ |
| | Izod impact strength (kg · cm/cm) | | 12 | 12 | 12 | 12 | 12 | 12 |
| Vicat softening temperature (°C.) | | | 105 | 105 | 105 | 105 | 105 | 105 |
| Molding appearance (discoloration and silvering) | | | good | good | good | good | good | good |
| Resistance to hot water | | | 5 | 5 | 5 | 5 | 5 | 5 |
| Resistance to high temperature and humidity 1 | | | 5 | 5 | 5 | 5 | 5 | 5 |
| Resistance to high temperature and humidity 2 | | | 5 | 5 | 5 | 5 | 5 | 5 |
| Resistance to high temperature and humidity 3 | | | 5 | 5 | 5 | 5 | 5 | 5 |

We claim:

1. A resin composition having excellent antistatic properties which comprises (A) 100 parts by weight of a styrene resin;

(B) 3 to 35 parts by weight per 100 parts by weight of (A) of a polyethylene oxide having a viscosity-average molecular weight of 15,000 to 1,500,000;

(C) 0.5 to 10 parts by weight per 100 parts by weight of (A) of a styrene-acrylonitrile-hydroxyalkyl acrylate copolymer and/or a styrene-acrylonitrile-hydroxyalkyl methacrylate copolymer different than the styrene resin of (A);

(D) 4 to 100 parts by weight per 100 parts by weight of (A) of a (meth)acrylic ester polymer; and (E) a surface-active agent comprising a sulfonic acid salt of the formula

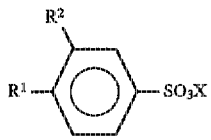

where each of $R^1$ and $R^2$ represents a hydrogen atom or an alkyl group of 12 or less carbon atoms and X represents one or more alkali metal atoms selected from the group consisting of Na, Li and K, or an alkylsulfuric acid salt of the formula

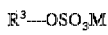

where $R^3$ represents an alkyl group of 8 to 20 carbon atoms and M represents one or more ions selected from the group consisting of K, Na, and $NH_4$, the surface-active agent being present in an amount of 0.4 to 5 parts by weight per 100 parts by weight of the combined amount of components (A), (B), (C) and (D).

2. The resin composition as claimed in claim 1 which further comprises (F) a (poly)ethylene glycol having an average molecular weight of 62 to 1,200 calculated by OH values, the (poly)ethylene glycol being present in an amount of 0.05 to 5 parts by weight per 100 parts by weight of the combined amount of components (A), (B), (C) and (D).

3. A resin composition having excellent antistatic properties which comprises (A) 100 parts by weight of a styrene resin;

(B) 3 to 35 parts by weight per 100 parts by weight of (A) of a polyethylene oxide having a viscosity-average molecular weight of 15,000 to 1,500,000;

(C) 0.5 to 10 parts by weight per 100 parts by weight of (A) of a styrene-acrylonitrile-hydroxyalkyl acrylate copolymer and/or a styrene-acrylonitrile-hydroxyalkyl methacrylate copolymer different than the styrene resin of (A);

(D) an oxide selected from the group consisting of titanium oxide, zinc oxide and magnesium oxide, the oxide being present in an amount of 0.7 to 5 parts by weight per 100 parts by weight of the combined amount of components (A) and (B); and (E) a surface-active agent comprising a sulfonic acid salt of the formula

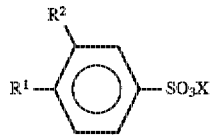

where each of $R^1$ and $R^2$ represents a hydrogen atom or an alkyl group of 12 or less carbon atoms and X represents one or more alkali metal atoms selected from the group consisting of Na, Li and K, or an alkylsulfuric salt of the formula

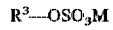

where $R^3$ represents an alkyl group of 8 to 20 carbon atoms and M represents one or more ions selected from the group consisting of K, Na, and $NH_4$, the surface-active agent being present in an amount of 0.4 to 5 parts by weight per 100 parts by weight of the combined amount of components (A), (B), (C) and (D).

4. The resin composition as claimed in claim 3 which further comprises (F) a (poly)ethylene glycol having an average molecular weight of 62 to 1,200 calculated by OH values, the (poly)ethylene glycol being present in an amount of 0.05 to 5 parts by weight per 100 parts by weight of the combined amount of components (A), (B), (C) and (D).

5. A resin composition having excellent antistatic properties which comprises (A) 100 parts by weight of a styrene resin;

(B) 3 to 35 parts by weight per 100 parts by weight of (A) of a polyethylene oxide having a viscosity-average molecular weight of 15,000 to 1,500,000;

(C) 0.5 to 10 parts by weight per 100 parts by weight of (A) of a styrene-acrylonitrile-hydroxyalkyl acrylate copolymer and/or a styrene-acrylonitrile-hydroxyalkyl methacrylate copolymer different than the styrene resin of (A);

($D_1$) 4 to 100 parts by weight per 100 parts by weight of (A) of a (meth)acrylic ester polymer; ($D_2$) and oxide selected from the group consisting of titanium oxide, zinc oxide and magnesium oxide, the oxide being present in an amount of 0.7 to 5 parts by weight per 100 parts by weight of the combined amount of components (A) and (B); and (E) a surface-active agent comprising a sulfonic acid salt of the formula

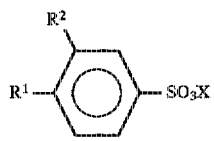

where each of $R^1$ and $R^2$ represents a hydrogen atom or an alkyl group of 12 or less carbon atoms and X represents one or more alkali metal atoms selected from the group consisting of Na, Li and K, or an alkylsulfuric salt of the formula

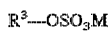

where $R^3$ represents an alkyl group of 8 to 20 carbon atoms and M represents one or more ions selected from the group consisting of K, Na, and $NH_4$, the surface-active agent being present in an amount of 0.4 to 5 parts by weight per 100 parts by weight of the combined amount of components (A), (B), (C) and (D).

6. The resin composition as claimed in claim 5 which further comprises (F) a (poly)ethylene glycol having an average molecular weight of 62 to 1,200 calculated by OH values, the (poly)ethylene glycol being present in an amount of 0.05 to 5 parts by weight per 100 parts by weight of the combined amount of components (A), (B), (C) and (D).

* * * * *